United States Patent [19]

Waldorf

[11] Patent Number: 4,688,394
[45] Date of Patent: Aug. 25, 1987

[54] AUTOMOTIVE HEATER AND AIR CONDITIONER AND PROCESS THEREFOR

[75] Inventor: Lindsey E. Waldorf, Ann Arbor, Mich.

[73] Assignee: Technology Un, Ltd., Ann Arbor, Mich.

[21] Appl. No.: 874,668

[22] Filed: Jun. 16, 1986

Related U.S. Application Data

[63] Continuation of Ser. No. 711,750, Mar. 14, 1985, abandoned.

[51] Int. Cl.$^4$ .............................................. B60H 1/32
[52] U.S. Cl. ....................................... 62/243; 62/244
[58] Field of Search .............. 62/239, 243, 244, 196 C

[56] References Cited

U.S. PATENT DOCUMENTS

| | | | |
|---|---|---|---|
| 2,806,358 | 9/1957 | Jacobs | 62/244 X |
| 3,209,551 | 10/1965 | Jentet | 62/243 X |
| 3,286,765 | 11/1966 | Jentet | 62/243 X |
| 4,123,916 | 11/1978 | Kreger | 62/243 |
| 4,137,726 | 2/1979 | Walada | 62/196 C |
| 4,164,850 | 9/1979 | Lowi, Jr. | 62/196 C |
| 4,320,628 | 3/1982 | Okajima | 62/244 X |
| 4,384,608 | 5/1983 | Scarlett et al. | 62/243 X |

*Primary Examiner*—Lloyd L. King
*Attorney, Agent, or Firm*—Miller, Morriss & Pappas

[57] ABSTRACT

An automotive heater and air conditioner in the form of a closed circuit reversible heat pump in which one internal heat exchanger accommodates both heating and cooling, selectively, and only a single set of ducts is required. Supplemental energy is provided in the system by using external heat exchanger means in close exchange proximity to and served by the waste heat of the automotive engine. The single exchanger selectively functions as evaporator and condenser. A reversible expansion valve functions between the external and inboard exchangers permitting selected conversion of the exchangers from a condenser to an evaporator function. Valving around the compressor permits selected directional control over refrigerant flow. The compressor can be selectively disconnected to turn off the heat pump. Air controllably ducted through, over and around the inboard exchanger is circulated into the passenger compartment to cool the occupants, to warm the occupants, and to defrost the windshield.

3 Claims, 3 Drawing Figures

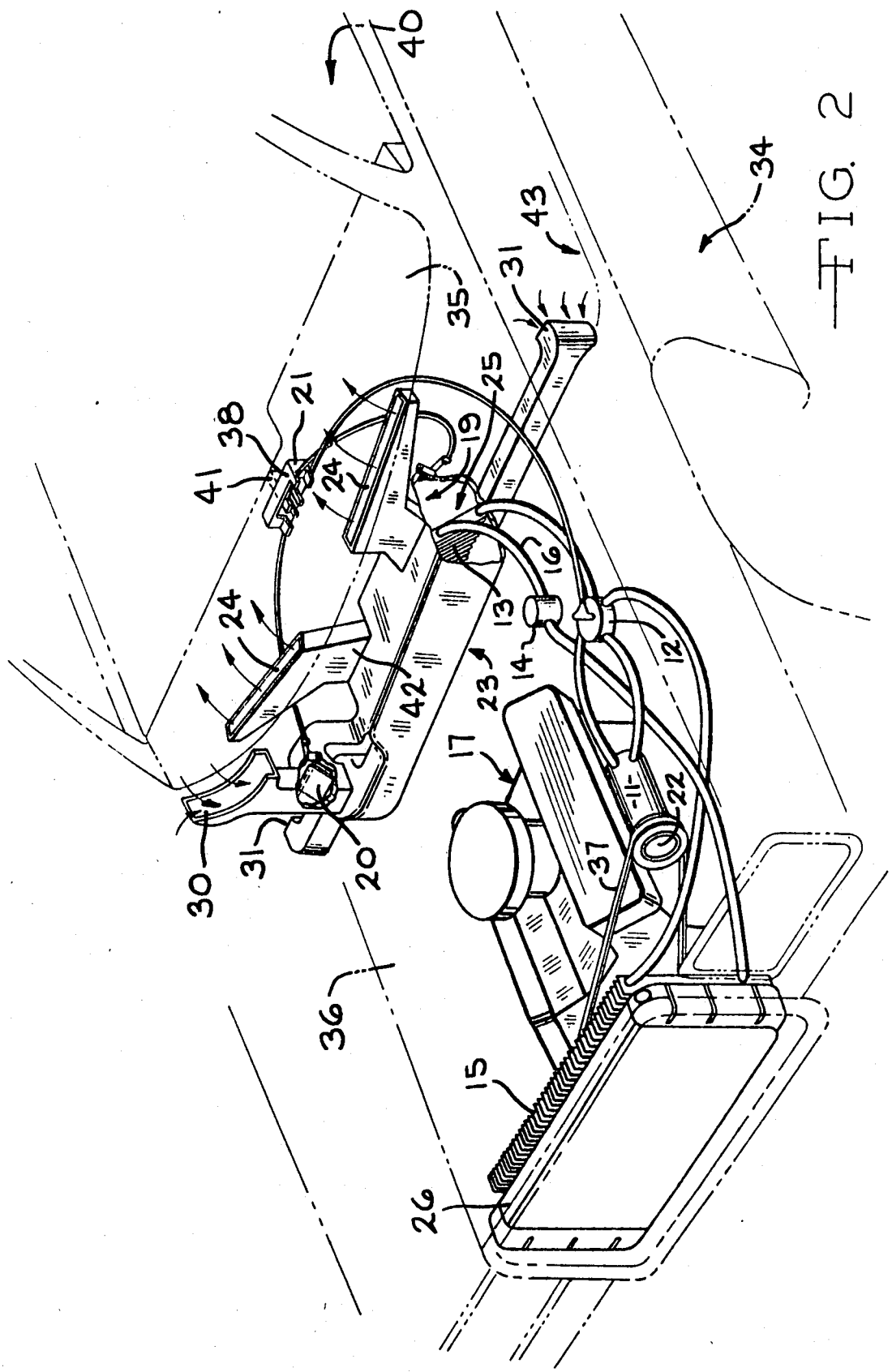

AUTOMOTIVE HEATER AND AIR CONDITIONER AND PROCESS THEREFOR

This is a continuation of co-pending application Ser. No. 711,750 filed on Mar. 14, 1985, now abandoned.

The present invention relates to a combination heater and air conditioner and process therefor primarily useful in automotive vehicles such as passenger cars, trucks and other structures having a substantial source of waste heat. A reversible closed heat pump circuit having circulating means such as a compressor powered by connection to an internal combustion engine and with a flow directing selector valve which acts selectively to reverse the closed circuit to move a refrigerant in an air conditioning direction or in an opposite heating direction. Two heat exchangers, an inboard exchanger and an outboard exchanger, are in the refrigerant cycle. Between the inboard and external exchangers is a reversible expansion valve. Depending on the flow direction of refrigerant from the compressor, the inboard exchanger selectively cools the interior of the vehicle through conventional ducting and selectively warms the interior of the vehicle. A fan in the ducting flows air over the inboard exchanger in a selected fresh air or recirculating air mode. The outboard exchanger, which is a part of the heat pump circuit, is in close heat exchange relation with a waste heat source, for example, a radiator core, the vehicle engine, and selected elements in the exhaust combustion gas system, for example, the catalytic chamber or compartment in which waste gases are combusted. Control in an "on-off" sense is via the compressor and the ducting and combinations of these are thermostatically cycled in accord with the demands of vehicle and climatic usage.

Heat pumps are old in commercial and residential heating and air conditioning. However, without a source of waste heat it is doubtful that such systems are less costly than others if the total energy content is considered and fuel is required to be burned in providing the necessary input total energy. In automobiles there is sample available waste energy available without penalty.

The present invention applies the heat pump concept to automobiles and other vehicles to realize unusual and previously unappreciated benefits over existing heating and cooling automotive systems. In general, separate air conditioning and heating apparatus has been herebefore required. First, the present invention allows the high amount of waste heat in a vehicle to be put to effective use. Second, the components such as the compressor valves, exchangers and conduit are presently available in and appear adequate for providing the required refrigerant circulation without involving auxiliary power. Thirdly, separate ducting and dampers for air conditioning, heating and defrosting can be greatly simplified. Fourthly, substantially instantaneous defrosting is available with appreciable contribution to winter driving safety. Fifthly, the controls for heating and air conditioning are vastly simplified where a single source of heating and cooling is available.

In the prior art, the U.S. Pat. No. 4,164,850 to A. Lowi, Jr. shows a system requiring extensive engine modifications to utilize waste heat in automobiles to improve defrosting and heating. Other proposals for defrosting included the provision of electrical resistance heating elements in the windshield. The impracticality of this latter approach to defrosting is demonstrated by the estimated requirement of three watts per square inch. This requirement proves to be an excessive load on the electrical systems of currently designed automobiles.

As background, the U.S. Pat. No. 4,137,726 to M. Watada indicates the use of a heat pump and that control is achieved by a by-pass valve means integrated in the compressor structure of an otherwise typical heat pump circuit.

The objects of the present invention are directed principally to a process and structure for achieving selected heating and cooling of passengers in automobiles using common and readily available apparatus with substantially no engine modifications, where the heat source does not tax the existing electrical circuitry and where the ducting for heating and cooling can be common to include defrosting and where the ample supply of waste energy is translatable into almost instantly available heating. The summation of these objects is a substantial economic and engineering advantage to the industry with savings suggested in (a) less space requirements for equipment in both the passenger and engine compartments, (b) reduced weight, (c) simplified ducting and controls, and (d) complete elimination of a heater core from the vehicle. A single inboard exchanger selectively serves the purpose for warming and cooling.

GENERAL DESCRIPTION

In general, the procedure of the present invention is in the use of a heat pump and circuit adapted to serve automobiles, trucks and similar vehicles in which waste heat is available and to provide a single exchanger functioning selectively as condenser and evaporator to provide heated air for the passenger compartment, or cooled air, as reasonably needed. The process for selective automotive heating and air conditioning comprises the steps of providing a reversible closed circuit heat pump in an automobile; extracting waste heat from the automobile in augmentation of the heat pump circuit; and selectively delivering warmed or cooled air to the passenger compartment of the automobile from the circuit. The process uses a single common heat exchanger serving the passenger compartment. The structure is extremely simple. A refrigerant media is circulated by a compressor in a closed circuit in one direction to cool and in the other or opposite direction to heat. Two exchangers are involved, one is located in heat exchange relation with a waste heat source (external or outboard exchanger) and the second exchanger (inboard or internal exchanger) is in the circuit and serves the passenger compartment of the automobile or vehicle by selectively supplying for heating and cooling. The inboard exchanger selectively functions as an evaporator and condenser. Means are provided to selectively reverse the flow in the circuit such as directional flow means and a reversible expansion valve is provided in the circuit between the external and internal exchangers. Ducting is provided into which the inboard exchanger is placed and air is flowed through the exchanger and selectively to defroster position and to upper and lower heating levels in the passenger compartment. Air delivered is selectively recirculated or supplemented, as desired, by entraining outside air. Blower means in the ducting assists in this function. Controls are simplified since both heating and cooling are from the common circuit and thermostatic means can select the heating and cooling functions and thermostatic means, for example, connected to the compressor can vary the compressor output between set limits. Airflow is adjusted automatically or by manual control of vents and fan speeds as is well-known in automotive fan and duct control.

IN THE DRAWINGS

FIG. 2 is a perspective partial phantom line view of an automobile and indicating the present invention as installed in the automobile.

SPECIFIC DESCRIPTION

Figure 1:
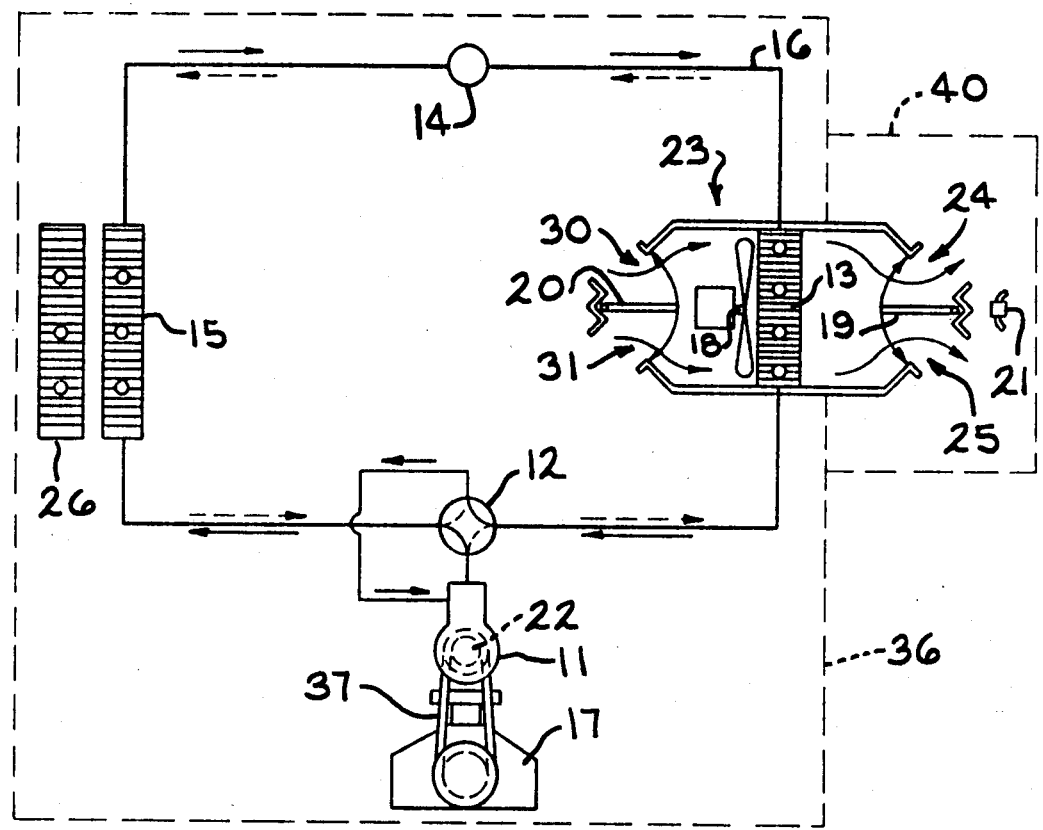
FIG. 1 is a schematic diagram view of an automotive heating and air conditioning apparatus and process of the present invention and indicating flow courses to achieve selected heating or cooling.

Referring to the drawings and first to the FIG. 1 thereof, the automotive heat pump heating and cooling circuit of the present invention is shown and includes the compressor 11. A flow director such as a four-way valve 12 permitting the reversal of flow in the circuit, an inboard or internal heat-exchanger 13, a reversible expansion valve 14 and an external or outboard heat exchanger 15 which are all series interconnected in the closed circuit connecting conduit 16. The external or outboard heat exchanger 15 is in close thermal proximity to the waste heat source 26 (for example, the radiator of an automobile) warmed by the internal combustion engine (not shown). The air circuit for the delivery of warm or cool air to the passenger compartment of an automobile is also shown and comprises a plenum 23 in which is located the inboard heat exchanger 13 and a blower or fan 18 arranged to travel air at selected speeds through the exchanger 13. A damper 19 at the downstream end of the plenum 23 adjusts the percentage of conditioned air flowing through the upper path 24 and the lower path 25. A damper 20 at the upstream entry end of the plenum 23 adjusts the flow and mix of recirculated inside air through port 30 and incoming outside air through port 31 available to the blower 18. A thermostat (not shown) senses the temperature inside the passenger compartment and through conventional manual or electrical means such as a relay (not shown) turns on and off the compressor 11. The heat pump unit, as seen in FIG. 1, operates selectively in the heating mode and cooling mode in accord with the direction of flow of the refrigerant in the circuit conduit 16. Functioning in the heating mode (flow arrow with dashed lines) (see also FIG. 2), the compressor 11 compresses the refrigerant which flows through the flow director four-way valve 12 to the inboard heat exchanger 13 and heats it. The damper 19, then, directs the air by movement of air over the exchanger 13 through the upper path 24 to the windows and through the lower path 25 and onto the floor of the vehicle or automobile (see FIG. 2). The thus cooled refrigerant then passes through the circuit conduit 16 and through the expansion valve 14 and then to the outboard heat exchanger 15 which (in the compartment-heating mode of operation) functions as an evaporator. In the evaporator, the refrigerant evaporates picking up heat from its thermal proximity to the waste heat source 26, such as for example, the automobile radiator, or the exhaust manifold or catalytic exhaust consumer of surplus organic combustibles. The refrigerant then returns to the suction side of the compressor 11 via the four-way valve 12 and is recycled. The heating of the compartment 40 is achieved when flow follows the direction indicated by the phantom lined flow arrows in FIG. 1.

By further reference to FIG. 1 and using the full line flow arrows, reversal of the flow of refrigerant will be seen to achieve selected cooling or air conditioning of the passenger compartment 40 in the vehicle 34. The refrigerant is compressed by the compressor 11 as selected by the flow director means 12 and is directed to the outboard heat exchanger 15 where the refrigerant is cooled and it then flows by the expansion valve 14 to the inboard heat exchanger 13 in the plenum 23. Air is moved by blower 18 (outside or recirculated air) over the inboard heat exchanger 13 and is cooled via the evaporation of the refrigerant and air is flowed via damper 19 through upper and lower paths 24 and 25 to cool the passenger compartment. Then the refrigerant is returned to the vacuum side of the compressor 11, in accord with the flow director 12, selection. The flow director is shown as a four-way valve.

The FIG. 2 is a cutaway schematic perspective diagram of a typical automobile 34 and showing a typical assemblage of the elements previously described in a preferred mode of installation in the vehicle 34. The compressor 11 in the engine compartment 36 is driven by the internal combustion engine 17 by clutch means such as the magnetic clutch 22 via a conventional V-Belt 37. The compressor 11 compresses refrigerant in the described circuit conduit 16 and the selective direction of refrigerant movement is via the flow director or four-way valve 12. The four-way valve 12 is operated manually or automatically by the heat or air conditioning selector element 38 located conveniently on the dash 39.

As can be seen in the FIG. 2, the air from the passenger compartment 40 can be recirculated over the inboard exchanger 13 and outside air can also be introduced to the passenger compartment 40 by the selection, via damper 20, on the upstream side of the inboard exchanger 13 in the extraction of heat from the exchanger 13. This may also be adjusted in cooling, as well. The damper 20 is remotely operated by a suitable lever 41 on the dash 39. The function may be manual or automatic. The thus warmed air is directed by the damper 19 through the upper path 24 in ducting 42 to the windshield 35 and through the lower path 25 in ducting 42 to the floor 43 of the automobile 34. As will be seen, reversal of the flow of refrigerant by means of the flow direction means 12, achieves a selected cooling of the passenger compartment 40.

Figure 3:
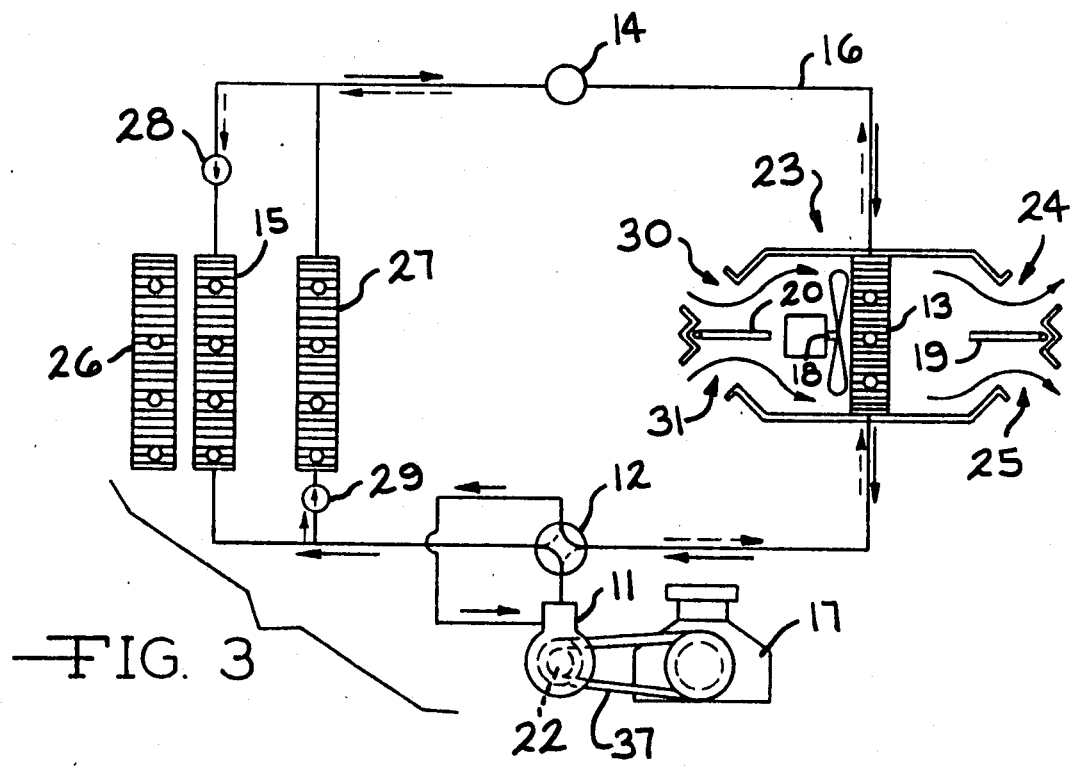
FIG. 3 is a schematic diagram view of a modified embodiment of the present invention in which two outboard exchangers are used, one being in close thermal proximity to a waste heat source for use as an evaporator in the winter season, and the other in the free airstream with uniflow directional means establishing flow therethrough.

In FIG. 3 a modified structure of the present invention is shown in schematic form in which two external or outboard exchangers 15 and 27 are employed. The exchanger 15 is in proximate heat exchange relation to the heat source 26 while the exchanger 27 is more remotely positioned in respect to the heat source as, for example, in an airstream receiving ambient air instead of air traversing through a radiator or in heat exchange relation with a manifold, engine, or catalytic combustion chamber. For heating and defrosting, the flow of refrigerant is indicated by the arrows with the dashed lines. The flow arrows with the solid lines indicate the movement of refrigerant in the cooling or air conditioning mode of operation. The inboard heat exchanger 13 remains as noted in the FIG. 1. Two check valve 28 and 29 have been inserted in the connecting conduits 16. These, as will be appreciated, modify the flow as between the heating and cooling directions assuring that the external or outboard exchanger 27 is in the closed circuit in the cooling mode since the check valve 29 is open to accommodate the flow from the compressor 11 to the reversible expansion valve 14 and thence to the inboard exchanger 13 and return to the compressor 11 with the flow direction means 12 indicated as a four-way valve. Flow in the cooling mode is prevented from moving through the external or outboard exchanger 15 by the check valve 28. The check valve 28 provides unidirectional flow through the exchanger 15 only in the heating mode when the refrigerant flows directly to the internal or inboard exchanger 13 from the compressor 11, thence through the expansion valve 14 and through the check valve 28 and the serially connected outboard exchanger 15 and returns to the compressor 11, as shown. Flow of air through and over the inboard exchanger 13 is conducted and directed as previously described. On and off control of the heating and cooling is by the simple expedient of disconnecting the compressor as at the magnetic clutch 22 by manual or electrical controls well-known in the art and in similar manner, the selection of mode is by remote manipulation of the flow direction control valve 12 selecting the appropriate flow direction as desired or called for by thermostatic monitors, not shown.

In operation, the structure of the present invention and the process practiced by the invention provides an economic and simple solution to the provision of air conditioning and heating of automobiles and other vehicles in which a source of waste heat is present. Existing apparatus is simplified and pieces are eliminated thereby permitting a substantial savings in space. The elements comprising the combination of the invention are well-known and readily available. Service of the apparatus is facilitated by the same simplicity. From an automotive point of view, reduction in weight is made possible and the heat pump enhances safety by providing fast and efficient heating of the passenger compartment and defrosting of the windshield. The use of waste heat is welcome to users of automobiles who look to improvement of overall efficiency. Plenum 23 and ducting 42 are easily adapted to particular vehicles and retrofitting, using flexible air conduits, is very easily achieved.

Having thus described my invention and at least one preferred embodiment thereof, those skilled in the art will perceive other changes, modifications and improvement therein. Such changes, modifications and improvements are intended to be included herein limited only by the scope of my hereinafter appended claims.

I claim:

1. An automotive heater and air conditioner circuit comprising:
   a heat pump having a reversible closed circuit refrigeration and heating means with a single compressor;
   an inboard heat exchanger located in the passenger compartment of a vehicle, a first heat exchanger in close heat exchange relation to a waste heat source external of the passenger compartment of said vehicle;
   a second external heat exchanger in the free air stream outside the passenger compartment of said vehicle in parallel flow relation to said first external exchanger and said first and second external heat exchangers selected by the directed flow of refrigerant and said exchangers in said closed circuit with an expansion valve between said inboard and said external heat exchangers;
   a flow director means in control relation in said heat pump thereby selectively cooling or warming said inboard heat exchanger; and
   ducting for entraining air over said inboard exchanger and then to selected disposition and circulation of the air selectively as warmed and cooled through an automobile.

2. An automotive heater and air conditioner comprising: a heat pump including:
   a reversible closed circuit refrigeration/heating means having a compressor, an inboard heat exchanger in the passenger compartment of a vehicle, at least one external heat exchanger in close heat exchanger relation to a waste heat source, and said inboard and external exchangers in said closed circuit with an expansion valve between said inboard and external exchangers;
   at least one additional heat exchanger in ambient air in parallel flow relation to said external exchangers in proximity to said waste heat source and said additional heat exchanger flow functioning only in one direction of flow of said refrigerant;
   a flow director means providing selective control to route refrigerant to selectively cool and warm said inboard exchanger; and
   ducting through which fresh and recirculated air is selectively entrained over said inboard exchanger and thence to selected disposition and circulation of the air as selectively warmed or cooled.

3. An automotive heater and air conditioner in an automobile having an internal combustion engine and a passenger compartment comprising:
   a heat pump including:
   a reversible closed circuit refrigeration/heating means having a compressor selectively driven by said automobile engine, an inboard heat exchanger in the passenger compartment of said automobile, a heat exchanger external of said passenger compartment in close heat exchange relation to a waste heat source of said automobile, and said exchangers in said closed circuit with an expansion valve between said exchangers;
   a second heat exchanger external of said passenger compartment of said automobile and in parallel flow relation with said first mentioned external exchanger and located in free air;
   flow director means providing selective control to route refrigerant to selectively cool and warm said inboard exchanger;
   unidirectional flow valves in said circuit to said external exchangers and directing flow through selected of said external exchangers for cooling and for heating; and
   ducting through which air is entrained over said inboard exchanger and thence to selected disposition and circulation of the air as warmed or cooled in said passenger compartment.

* * * * *